United States Patent [19]

Spencer

[11] Patent Number: 5,198,764

[45] Date of Patent: Mar. 30, 1993

[54] POSITION DETECTOR APPARATUS AND METHOD UTILIZING A TRANSIENT VOLTAGE WAVEFORM PROCESSOR

[75] Inventor: Mark E. Spencer, Mesa, Ariz.

[73] Assignee: Sentech Corp., Tempe, Ariz.

[21] Appl. No.: 660,518

[22] Filed: Feb. 22, 1991

[51] Int. Cl.[5] .................... G01B 7/14; G01R 33/12; G01N 27/72; G01V 3/10

[52] U.S. Cl. .................... 324/207.26; 324/202; 324/207.16; 324/234; 324/236; 324/654; 331/65

[58] Field of Search ............... 324/207.12, 207.16, 324/207.17, 207.26, 202, 239, 326, 329, 336, 654–657, 234, 236, 237; 340/941; 331/65

[56] References Cited

U.S. PATENT DOCUMENTS

| | | |
|---|---|---|
| 3,373,374 | 3/1968 | Marosi ............................ 340/941 |
| 3,375,493 | 3/1968 | Gottlieb ........................ 340/941 X |
| 3,685,013 | 8/1972 | Brickner ........................ 340/941 X |
| 3,707,672 | 12/1972 | Miller et al. .................... 324/239 |
| 3,735,229 | 5/1973 | Brockmuller . |
| 3,851,242 | 11/1974 | Ellis . |
| 3,870,990 | 3/1975 | Fathauer ........................ 340/941 X |
| 3,875,555 | 4/1975 | Potter .............................. 340/941 X |
| 4,560,929 | 12/1985 | Melnyk ........................... 324/207.16 |
| 4,595,877 | 6/1986 | Dulk .............................. 324/239 |
| 4,600,356 | 7/1986 | Bridges et al. ................. 324/336 |
| 4,843,259 | 6/1989 | Weisshaupt ................ 324/207.26 X |
| 4,868,504 | 9/1989 | Johnson ........................ 324/239 X |
| 4,879,512 | 11/1989 | Leonard et al. ............... 324/207.16 |
| 4,893,076 | 1/1990 | Leonard et al. ............... 324/207.17 |

Primary Examiner—Gerard R. Strecker
Attorney, Agent, or Firm—Nilsson, Wurst & Green

[57] ABSTRACT

A position detection method and apparatus is disclosed which utilizes an electromagnetic probe as the control element in a relaxation oscillator circuit. The probe is energized by a pulse voltage waveform and the decay time of the induced transient probe voltage is utilized to modulate the frequency of the pulse generator. The probe transient voltage decay time is influenced by the proximity of an electrically conductive or magnetic object. Therefore, a frequency output is generated which indicates the position of the conductive or magnetic object.

43 Claims, 6 Drawing Sheets

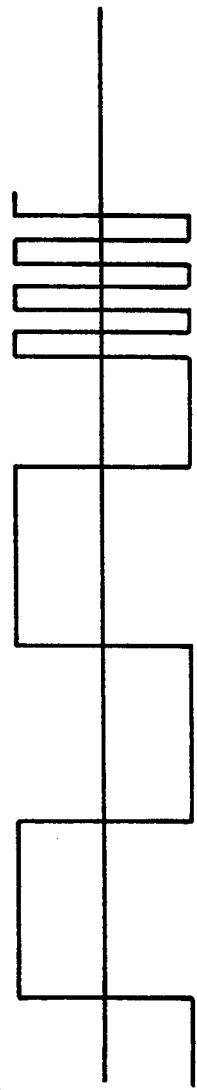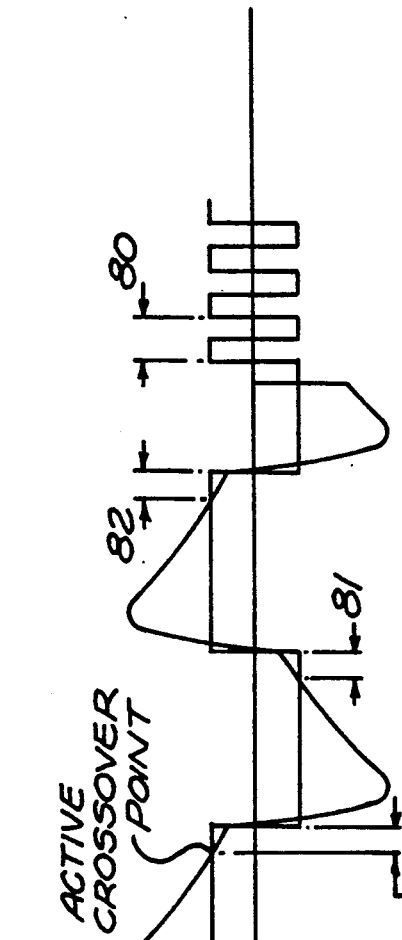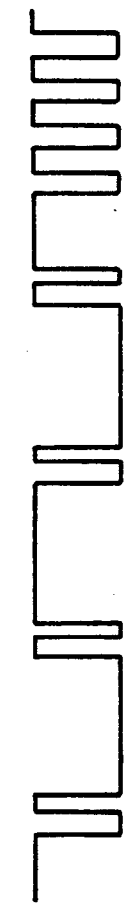
FIG. 6

POSITION DETECTOR APPARATUS AND METHOD UTILIZING A TRANSIENT VOLTAGE WAVEFORM PROCESSOR

BACKGROUND OF THE INVENTION

1. Field of the Invention

This invention relates to position detection apparatus and methods, and more particularly, to non-contact position detecting apparatus and methods. The related position detection apparatus and methods measure the time response of a transient voltage waveform in an electromagnetic probe (i.e., a probe generating an electromagnetic field) placed in the proximity of an electrically conductive element.

2. Description of the Related Art

The related art discloses several position detection apparatus and methods which use the response characteristics of a transient voltage induced in an electromagnetic probe to measure the position of a conductive element.

U.S. Pat. No. 4,560,929 (Melnyk) discloses an apparatus and method employing damped oscillations to sense the position of an electrically conductive printing band. A low frequency oscillator is used to generate, at periodic intervals, an excitation pulse which induces high frequency oscillations in the tuned coil assembly. The number of oscillatory cycles resulting from a single excitation pulse is a function of the system damping, the system damping being determined by the eddy current losses associated with the metallic printing band moving through the magnetic field of the sensing element. Therefore, the number of oscillatory cycles is representative of the printing band displacement or position. This method of eddy current sensing has the primary disadvantage in that the resolution is limited to a complete oscillation cycle. In order to achieve a high resolution response, it is necessary to set the threshold voltage used for oscillation detection very low, a condition which results in an unacceptably low signal to noise ratio for many applications. A second disadvantage which limits the applicability of this technique, particularly in vibration measurement, is that the response time of the system is slow because a large number of cycles must be processed to derive the positional information.

U.S. Pat. No. 4,843,259 (Weisshaupt) discloses a position detection apparatus and method which evaluates the damped oscillatory response of an inductive probe to a pulse function input by rectifying the signal and evaluating the envelope of the response. This method of proximity detection has the primary disadvantage in that the envelope of the response is subject to errors associated with component parameter variations. The component parameter variations result from changes in ambient temperature typical of analog signal processing circuitry. Other disadvantages of this technique include a slow response time and the relative complexity of the analog to digital processing circuitry used to demodulate the envelope.

U.S. Pat. No. 3,735,229 (Brockmuller) discloses an oscillating servo motor control circuit which periodically energizes a resonant RLC (resistive, inductive, capacitive) tank circuit to measure the degree of damping. The degree of damping is determined by the proximity of an eddy current body. The damped oscillatory response waveform of the resonant tank circuit is rectified, integrated, and compared with a threshold voltage to generate a signal which is used for corrective positioning of the eddy current body. By deriving the positional information from the integral of the tank circuit response, the accuracy of the system has the typical limitations inherent to analog signal processing over varying ambient temperatures. This technique has the additional limitation of an excessively slow response time.

OBJECTS AND SUMMARY OF THE INVENTION

Accordingly, it is an object of this invention to provide a high speed, precision apparatus and method for non-contact position measurement of an electrically conductive or a magnetic element.

It is an important feature of this invention to provide a position sensing apparatus which relatively stable as a function of temperature, the stability allowing the precision to be maintained over large ambient temperature variations.

It is another feature of the present invention to provide a position detector apparatus and method which utilize the transient response characteristics of an RLC (resistive, inductive, capacitive) probe assembly to establish a frequency modulated digital output signal that is related to the magnitude of the magnetic flux resulting from the interaction of the probe with an electrically conductive or magnetic element.

Yet another feature of this invention is to provide a position detection apparatus which utilizes a reduced number of electronic components to enhance reliability and to decrease the sensitivity of the system response to changes in the delay of the transient probe voltage detection circuitry.

A further feature of the present invention is to provide a position sensing apparatus which has an output response that is virtually independent of changes in the magnitude of the electromagnetic probe excitation source.

Still another feature of the present invention is to provide a position detector apparatus and method having an output response with a reduced sensitivity to changes in the resistance and capacitance of the RLC probe assembly, the position detector apparatus and method maintaining a high sensitivity to changes in the impedance of the probe associated with variations in the magnetic flux linking the electrically conductive or magnetic element.

The foregoing and other features of the present invention are attained, according to the present invention, by providing a steady-state oscillator that has an output frequency which is a function of the damping of a transient voltage waveform induced in an electromagnetic probe. In response to an input transition from the digital control circuitry, a step function generator switches its output voltage polarity. This signal provides both the excitation to induce a transient voltage waveform in the electromagnetic probe, the transient voltage waveform being sensed at one input of a voltage comparator, and a reference voltage used to establish the threshold voltage at the second input to the comparator. The damping of the transient probe voltage is related to the magnitude of the eddy current generated in the electrically conductive element in response to interaction with the magnetic field of the probe. Therefore, the period of time required for the transient voltage waveform to decay to and cross the comparator threshold voltage is related to the position of the conductive element relative to the electromagnetic probe. The digital control circuitry selects a plurality of output transitions generated each cycle by the comparator to provide the alternating polarity control signal to the step function generator at the appropriate threshold crossing.

To provide a complete disclosure of the invention including additional objects, features and advantages, reference is made to the appended drawings and the following detailed description of the preferred embodiments.

BRIEF DESCRIPTION OF THE DRAWINGS

FIG. 6 is a diagram of voltage waveforms occurring in the circuit of FIG. 5 operating in both the normal operating mode and the calibration mode.

DETAILED DESCRIPTION OF THE INVENTION

Figure 1:
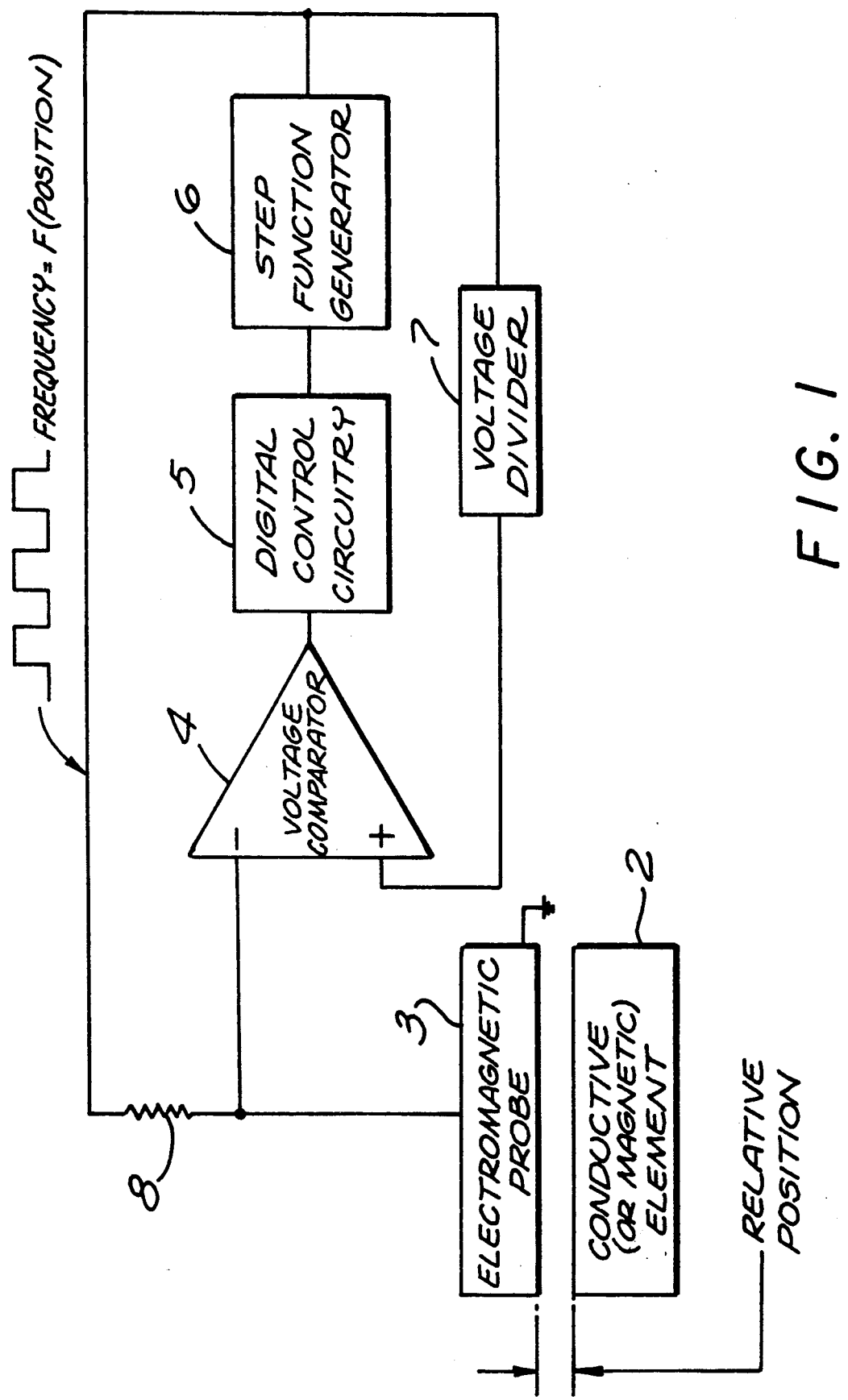
FIG. 1 illustrates the generalized configuration of a position sensing apparatus incorporating the principles of the present invention.

Referring first to FIG. 1, a position sensing apparatus incorporating the principles of the invention is shown. The position sensing apparatus comprises in general a step function generator 6, an electromagnetic probe 3, a voltage comparator 4, and digital control circuitry 5. Conductive (or magnetic) element 2 whose position is to be sensed by the apparatus is located adjacent to electromagnetic probe 3. The step function generator 6 switches the polarity of its output voltage in response to an input transition from the digital control circuitry 5. The output terminal of the step function generator 6 is connected through a voltage divider 7 to the non-inverting input terminal of the voltage comparator 4 to establish a bi-level threshold voltage and the output terminal is additionally tied to the electromagnetic probe 3 and the inverting input terminal of the voltage comparator 4 through a resistor 8. The resistor 8 controls the excitation current to the probe 3.

Figure 2:
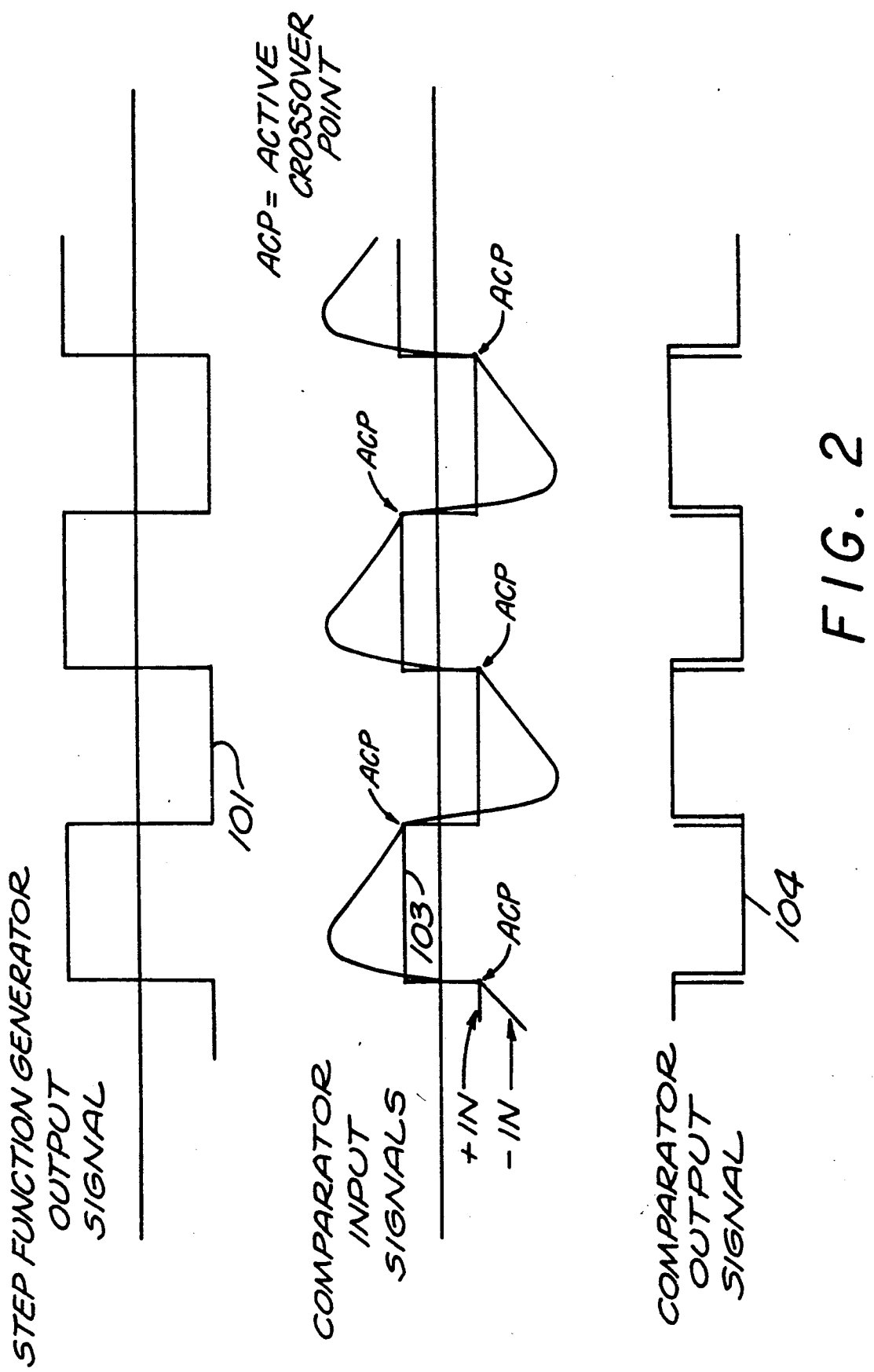
FIG. 2 is a diagram of voltage waveforms occurring in the circuit of FIG. 1.

As illustrated in FIG. 2, a transient voltage waveform 102 is generated in the electromagnetic probe in response to the abrupt change in the excitation voltage level 101 provided by the step function generator. The points at which the transient probe voltage decays to and crosses the comparator threshold voltage 103 are defined as the active crossover points. The comparator output transitions in waveform 104 associated with the active crossover points are detected by the digital control circuitry which responds by toggling the input control signal to the step function generator thereby inducing a transient response in the probe of opposite polarity and sustaining the oscillatory condition.

Figure 3:
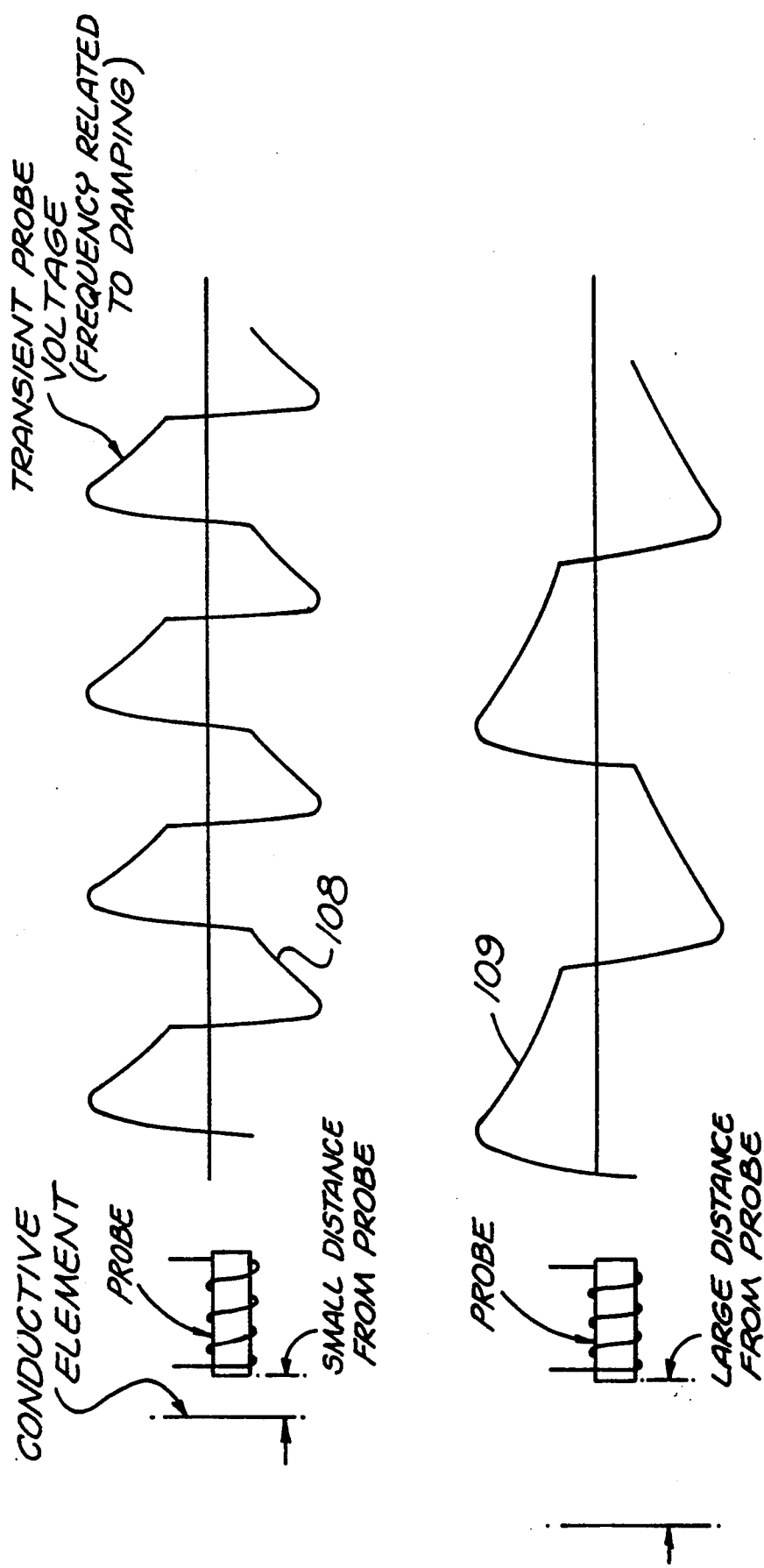
FIG. 3 illustrates the variable damping of the transient probe voltage and the associated change in the oscillation frequency in relation to the position of the conductive element.

Because the time required for the transient probe voltage to decay to the active crossover point is a function of the resistive-reactive impedance of the probe, the oscillation frequency is related to the position of the conductive (or magnetic) element. A typical variation in the damping of the transient probe voltage due to a change in the proximity of the conductive element is illustrated in FIG. 3. Voltage waveform 109 represents the response when the probe is positioned at a relatively large distance from the conductive element. As the conductive element is positioned to interact with more of the magnetic flux generated by the probe, there is a corresponding increase in the magnitude of the eddy current induced in the conductive element. This increase in eddy current reduces the impedance of the probe thereby allowing the transient voltage 108 to decay at a faster rate and reach the active crossover point in a shorter time interval.

In addition to providing continuous positional resolution, this method of position sensing has the advantage of optimizing the response time because the positional information is acquired in a partial period of a single transient relaxation cycle. Also, because both inputs to the voltage comparator are derived from the same reference voltage provided at the step function generator output, the oscillation frequency is independent to a first degree of changes in the excitation voltage magnitude and enhanced accuracy is realized.

Figure 4:
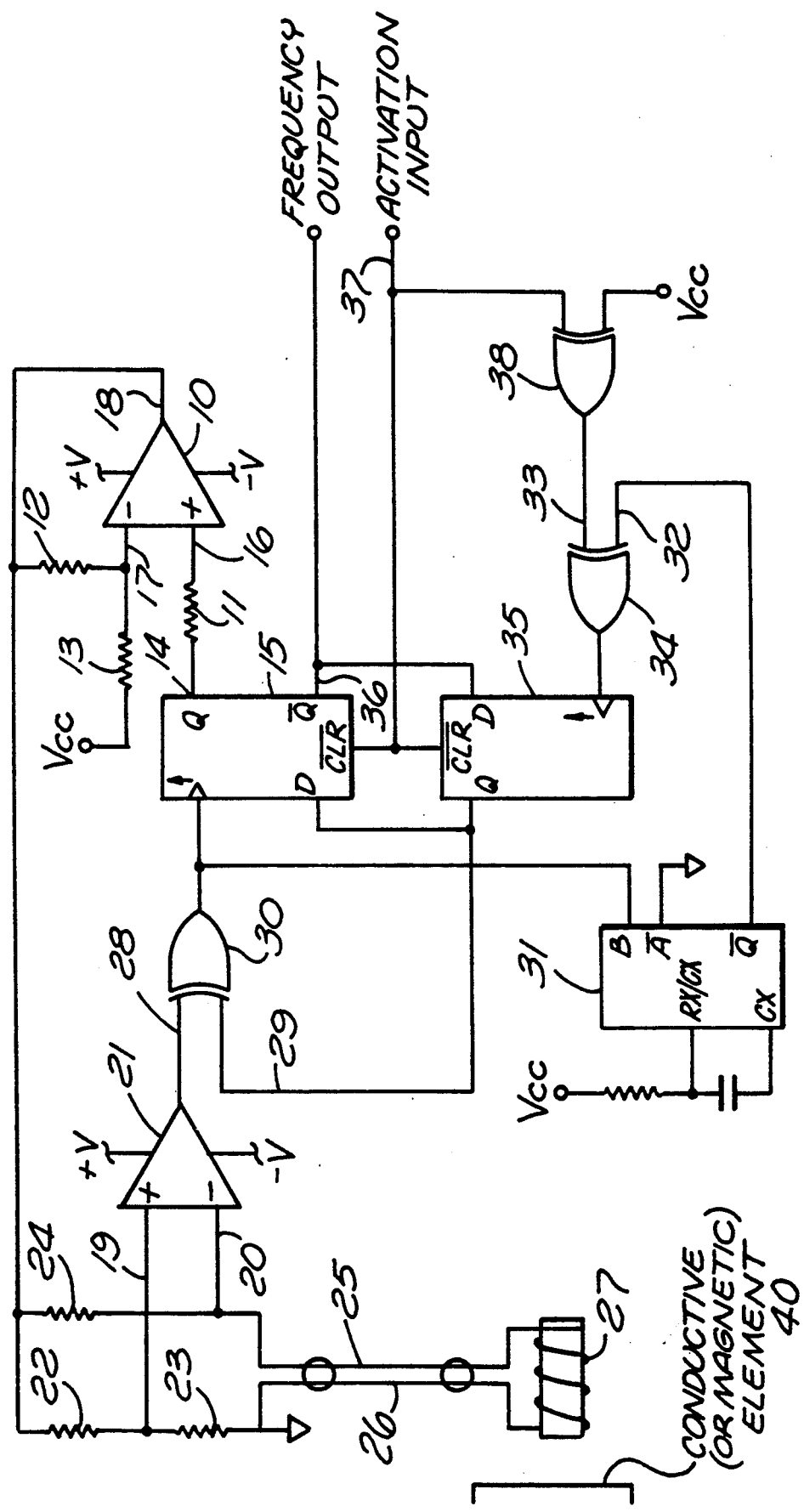
FIG. 4 is a detailed schematic of one particular implementation of the apparatus shown in FIG. 1.

A detailed implementation of this embodiment of the invention is shown in FIG. 4. The high speed operational amplifier 10 of the step function generator receives a polarity control signal from output terminal 14 of flip-flop (bi-stable multivibrator) 15. The output terminal 14 is coupled to the non-inverting input terminal 16 of operational amplifier 10 through resistor 11. The inverting input terminal 17 of operational amplifier 10 is coupled to the digital voltage supply through resistor 13 and is coupled to the output terminal 18 of operational amplifier 10 through resistor 12 which has a resistance substantially equal to resistor 13. CMOS technology is used to implement flip-flop 15 so that a high or a low level input voltage at the non-inverting input of operational amplifier 10 is substantially equal to the digital supply voltage or ground potential, respectively. By configuring the operational amplifier in this way, the magnitude of the voltage at output terminal 18 is substantially equal to the magnitude of the digital supply voltage and the polarity of the output voltage is positive or negative when output terminal 14 of flip-flop 15 is high or low, respectively. The non-inverting input terminal 19 of voltage comparator 21 is coupled to the output of operational amplifier 10 through resistor 22 and is additionally coupled to ground through resistor 23. The inverting input terminal 20 of voltage comparator 21 is coupled to lead 25 and is coupled to the output of operational amplifier 10 through resistor 24. Lead 25 is coupled to lead 26 through windings 27, windings which generate the external magnetic field that interacts with conductive element 40. Lead 26 is coupled to ground.

Because the excitation source consists of a negative feedback amplifier which provides a very low source impedance and because the input impedance of the voltage comparator is extremely high, the damping of the transient voltage response in the probe is virtually independent of these interface parameters. Therefore, this circuit arrangement adds to the stability and accuracy of the oscillation frequency by essentially eliminating changes in the waveform damping due to variation in these parameters with changes in ambient temperature. The only additional components which combine with the resistive-reactive impedance of the probe to determine the damping coefficient of the transient probe voltage are resistor 24 and the impedance of the interface cable. A further advantage of this apparatus is that the circuit can operate with a transient voltage response provided by the probe ranging from highly underdamped to highly overdamped. This range allows the accommodation of a large variety of probes and interface cable lengths. Typically, resistor 24 is adjusted to operate the circuit in an overdamped mode which increases the sensitivity to changes in the effective inductance of the probe while reducing the sensitivity to the interface cable capacitance. This transient response selection provides a means by which the accuracy of the system is not significantly affected by environmentally induced changes in the capacitance of the interface cable. The distance between the electrically conductive material and the electromagnetic probe can be calibrated empirically for a given configuration and material.

The digital level output of the voltage comparator 21 provides a direct interface to the digital control circuitry at input terminal 28 of exclusive OR gate 30. Depending on the polarity of the excitation voltage, either a rising or a falling transition at the comparator output may be associated with an active crossover point. Exclusive OR gate 30 is configured so that a rising edge clock signal is generated for all active crossover points. The output terminal of exclusive OR gate 30 is coupled to both the clock input of flip-flop 15 and the positive-transition-triggered input of one-shot (mono-stable multivibrator) 31. On detection of an active crossover point the output of flip-flop 15 toggles and one-shot 31 is activated. The active low output of one-shot 31 is coupled to input terminal 32 of exclusive OR gate 34 and the output of exclusive OR gate 34 is coupled to the clock input of flip-flop 35. The complementary polarity control signal provided at output terminal 36 of flip-flop 15 is coupled to the input terminal of flip-flop 35 and is clocked through to the output of flip-flop 35 at the end of the one-shot period. The feedback signal at the non-inverting output of flip-flop 35 is coupled to both the input of flip-flop 15 and input terminal 29 of exclusive OR gate 30. The minimum pulse width for one-shot 31 is adjusted so that the feedback to the input of flip-flop 15 is updated after all transitions to the clock input of flip-flop 15 which result from comparator output transitions not associated with an active crossover point have occurred. The maximum pulse width is set to ensure that the feedback update occurs before the active crossover point associated with the maximum operating frequency is reached. The activation input line 37 couples an externally generated digital start/stop signal to the clear terminals of flip-flop 15 and flip-flop 35 and through exclusive OR gate 38. Exclusive OR gate 38 is configured as an inverter and coupled to input terminal 33 of exclusive OR gate 34. A low logic level applied to this input terminal holds the circuit in a reset mode inhibiting oscillation. A rising-edge transition on this control input activates the circuit. In addition to providing a means to initialize the circuit after power is applied, the activation input terminal also provides a simple means to reduce cross interference in multi-channel systems with electromagnetic probes in close proximity by deactivating the channels not currently being sampled.

By using only two high speed digital components (exclusive OR gate 30 and flip-flop 15) in the loop which affects the oscillation frequency, changes in delay through the digital control circuitry introduced as a result of variations in ambient temperature have little effect on the accuracy of the circuit. Therefore, the primary limitation to the temperature stability of this apparatus is the change in the propagation delays and slew rates of the step function generator and of the voltage comparator. Low cost, active devices for implementing these functions are readily available which have sufficiently low dynamic response temperature coefficients that this embodiment typically requires no additional compensation to maintain an extremely accurate response over large temperature variations. For example, at a nominal operating frequency of 50 kHz, the oscillation frequency temperature coefficient is typically less than 0.001 percent/degree centigrade using an AD790 voltage comparator and an AD841 operational amplifier in the implementation of the step function generator.

An additional embodiment of the invention is also disclosed which includes a calibration apparatus to enhance further the temperature stability of the positional information. This design includes means to switch between the normal mode, where the frequency of oscillation is determined by the damping of the transient probe voltage and the delay through the signal processing electronics, and a calibration mode in which the oscillation frequency is determined by the delays through the circuit only. The calibration mode frequency is periodically measured and this data is used to compute a correction term that is a function of the variation in the circuit delays associated with changes in the ambient temperature. The correction term is then used in conjunction with the normal mode frequency data to determine the temperature compensated position output signal.

Figure 5:
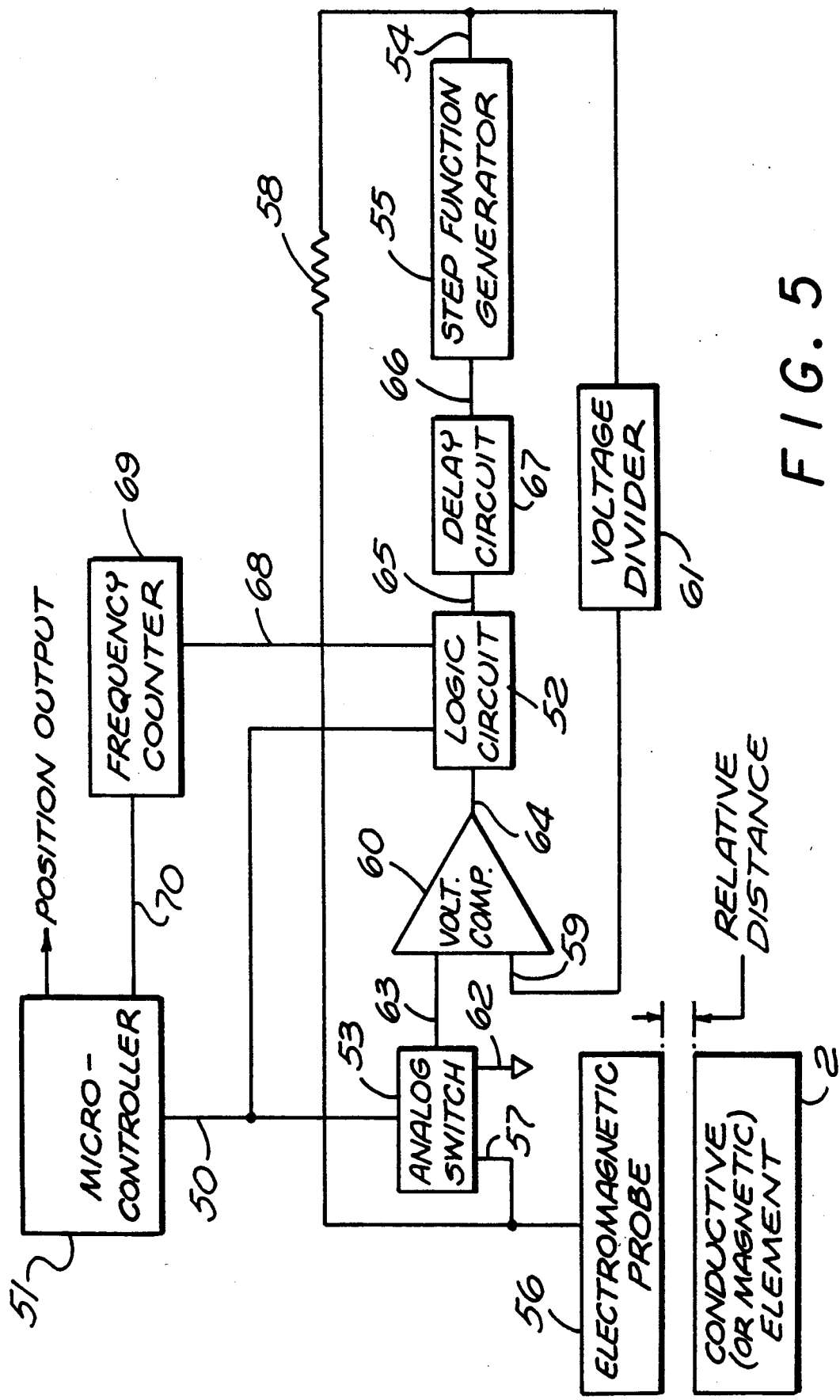
FIG. 5 illustrates a second embodiment of the invention that includes apparatus to detect changes in the circuit delay associated with variations in ambient temperature and apparatus to compute a temperature compensated position output signal.

Referring to FIG. 5, the basic proximeter of FIG. 1 is changed to include a modified logic circuit, which accommodates a mode control input, the addition of an analog switch, and a delay circuit. Control line 50 coupled from microcontroller 51 to logic circuit 52 and analog switch 53 provides a means to change between normal mode and calibration mode of operation. Output terminal 54 of step function generator 55 is coupled to electromagnetic probe 56 and input terminal 57 of analog switch 53 through resistor 58, and is coupled to input terminal 59 of voltage comparator 60 through voltage divider 61. Input terminal 62 of analog switch 53 is coupled to ground and the output terminal is coupled to input terminal 63 of the voltage comparator. Logic circuit 52 monitors the comparator output terminal through input terminal 64 and logic circuit output terminal 65 is coupled to input terminal 66 of the step function generator through delay circuit 67. Logic circuit 52 provides the oscillator output signal to frequency counter 69 through line 68 and microcontroller 51 communicates with the frequency counter through interface bus 70.

In the normal mode, the analog switch couples the signal on the probe to the voltage comparator and the circuit functions as described in the first embodiment with the exception that the output frequency is reduced by the additional delay of delay circuit 67. In the calibration mode, the analog switch couples the ground reference to the voltage comparator and the logic circuit output toggles on all comparator output transitions. The response of the circuit in both the normal mode and the calibration mode is shown in the voltage waveforms of FIG. 6. The logic circuit is configured so that the same gates determine the delay through the logic in both modes of operation. Therefore, the period of the oscillation frequency in the calibration mode, designated by reference 80, is substantially equal to the sum of delay 81 and delay 82 in the normal mode waveforms. The nominal calibration mode frequency is adjusted by changing the delay through delay circuit 67. This delay is typically kept small in order to maintain a high positional sensitivity in the normal mode and yet large enough to allow the output signal of the step function generator to settle from the large signal excursion before the next level transition in the calibration mode. By allowing for overdrive recovery, changes in the calibration mode data more accurately represent the changes in the circuit delay that occur when operating in the normal mode. The relationship between the calibration mode frequency and the normal mode frequency is very linear over large variations in ambient temperature. Therefore, the equations below are used to determine the temperature compensated normal mode frequency which the microcontroller uses to calculate the position of the conductive element.

$$CT = m \cdot FC + b$$

where,

CT = correction term
FC = calibration mode frequency
m = normalized correction term slope (determined empirically)
b = normalized correction term offset (determined empirically), and
F = FN/CT where,
F = temperature compensated normal mode frequency
FN = normal mode frequency While only two embodiments of the invention have been disclosed herein, it will be readily apparent to those skilled in the art that numerous modifications can be made thereto, including the use of equivalent means and devices without departing from the spirit and scope of the invention. For example, while the preferred embodiments are herein described in terms of the successive application of symmetric voltage step functions, it will be clear that other forcing functions, including the use of a current mode source, can be applied to the probe. Additionally, the amplitude of the transient probe voltage is compared with a reference voltage to determine at which point to generate a new transient state. However, other parameters, such as the integral of the transient probe voltage, can be used to trigger the generation of a new transient state. The apparatus disclosed herein is also described in terms of sensing the eddy current generated in a conductive material. However, the present technique can be used as well to determine the distance between the probe and a magnetic material, the magnetic material causing changes in the reluctance of the magnetic circuit interacting with the magnetic field of the probe that are function of the distance of the probe from the magnetic material. As a result, the oscillation of the position sensing circuit is a function of the distance between the probe and the magnetic material. It is intended by the appended claims to cover any and all such modifications. The claims are to be given the broadest scope consistent with the principles of the teachings provided herein.

What is claimed is:

1. A method for sensing changes in inductance of an electromagnetic probe due to the influence of a magnetic or an electrically conductive element comprising the steps of:

placing said electromagnetic probe in proximity to said element, said electromagnetic probe generating a magnetic field when energized;

energizing said probe with a pulsed electrical waveform to induce a transient signal in said probe in response to the inductance of the probe under the influence of said element;

comparing said transient signal to a reference signal to produce a control signal, said reference signal being derived from said pulsed electrical waveform and representing a degree of decay of said transient signal; and reenergizing said probe with said pulsed electrical waveform in response to said control signal to generate a plurality of said transient signals at a frequency related to said inductance of the probe, the frequency of said transient signals indicating the changes in inductance of the probe due to the influence of the element.

2. The method of claim 1 wherein said step of energizing the probe further comprises the step of producing an eddy current response having a particular magnitude in said magnetic or electrically conductive element corresponding to the position of said element.

3. The method of claim 2 wherein said step of producing an eddy current response further comprises the steps of increasing the magnitude of said eddy current response when said magnetic or electrically conductive element is disposed closer to said electromagnetic probe and reducing the magnitude of said eddy current response when said magnetic or said electrically conductive element is disposed farther from said electromagnetic probe.

4. The method of claim 3 wherein in said step of energizing the probe, the transient decay time of said transient signal induced in said probe is reduced when said magnitude of said eddy current response is increased and wherein the transient decay time of said transient signal induced in said probe is increased when said magnitude of said eddy current response is decreased.

5. The method of claim 4 wherein in said step of reenergizing the probe, the frequency of said pulsed electrical waveform is increased when said transient decay time is decreased and wherein the frequency of said pulsed electrical waveform is decreased when said transient decay time is increased.

6. The method of claim 5 wherein in said step of reenergizing the probe, an increase in the frequency of said pulsed electrical waveform indicates that said element is disposed closer to said probe and wherein a decrease in the frequency of said pulsed electrical waveform indicates that said element is disposed farther from said probe.

7. The method of claim 1 wherein said step of reenergizing the probe further comprises the step of applying a plurality of said pulsed electrical waveforms in alternating polarity to said probe.

8. The method of claim 1 wherein said steps of energizing and reenergizing the probe further comprise the steps of both applying said pulsed electrical waveform to said probe as an excitation signal and using said pulsed electrical waveform as the reference against which said transient signal is compared.

9. The method of claim 8 wherein in said step of reenergizing the probe, the frequency of said pulsed electrical waveform is substantially independent of the magnitude of excitation of said probe.

10. The method of claim 5 wherein said steps of energizing and reenergizing the probe further comprise the step of inducing an overdamped transient signal.

11. The method of claim 5 wherein in said step of reenergizing the probe, the frequency of said pulsed electrical waveform is substantially independent of changes in ambient temperature.

12. The method of claim 5 wherein in said step of energizing the probe, the frequency of said pulsed electrical waveform is substantially independent of changes in resistive and capacitive characteristics of said probe.

13. The method of claim 5 further including the step of providing a digital output signal from said plurality of transient signals to indicate said position of said element.

14. An oscillator for sensing changes in inductance due to the influence of a magnetic or an electrically conductive element comprising:
   an electromagnetic probe generating a magnetic field when energized;
   a generator circuit coupled to said electromagnetic probe to generate a pulsed electrical waveform for energizing said electromagnetic probe and inducing a transient signal in said probe in response to the inductance of the probe under the influence of said element; and
   a comparator circuit for receiving said transient signal and having an output coupled to said generator circuit, wherein said transient signal is coupled to a first input of said comparator circuit, to compare said transient signal to a reference signal derived from said pulsed electrical waveform and representing a degree of decay of said transient signal, said reference signal coupled to a second input of said comparator circuit, and to produce at its output a control signal to cause said generator circuit to reenergize said probe with said pulsed electrical waveform to generate a plurality of said transient signals at a frequency related to said inductance of the probe, the frequency of said transient signals indicating the changes in inductance of the probe due to the influence of the element.

15. The oscillator of claim 14 wherein said electromagnetic probe energized by said pulsed electrical waveform produces an eddy current response having a particular magnitude in said magnetic or electrically conductive element corresponding to the position of the element.

16. The oscillator of claim 15 wherein said magnitude of said eddy current response is increased when said magnetic or said electrically conductive element is disposed closer to said electromagnetic probe and said magnitude of said eddy current response is reduced when said magnetic or electrically conductive element is disposed farther from said electromagnetic probe.

17. The oscillator of claim 16 wherein the transient decay time of said transient signal induced in said probe is reduced when said magnitude of said eddy current response is increased and wherein the transient decay time of said transient signal induced in said probe means is increased when said magnitude of said eddy current response is decreased.

18. The oscillator of claim 17 wherein the frequency of said pulsed electrical waveform is increased when said transient decay time is decreased and wherein the frequency of said pulsed electrical waveform is decreased when said transient decay time is increased.

19. The oscillator of claim 18 wherein an increase in the frequency of said pulsed electrical waveform indicates that said element is disposed closer to said probe and wherein a decrease in the frequency of said pulsed electrical waveform indicates that said element is disposed farther from said element.

20. The oscillator of claim 18 wherein a plurality of said pulsed electrical waveforms are applied to said probe in alternating polarity.

21. The oscillator of claim 18 wherein said pulsed electrical waveform provides both an excitation signal for said probe means and the reference against which said transient signal is compared.

22. The oscillator of claim 21 wherein the frequency of said pulsed electrical waveform is substantially independent of the magnitude of excitation of said probe.

23. The oscillator of claim 18 wherein said transient signal response is overdamped.

24. The oscillator of claim 23 wherein the frequency of said pulsed electrical waveform is substantially independent of changes in ambient temperature.

25. The oscillator of claim 23 wherein the frequency of said pulsed electrical waveform is substantially independent of changes in resistive and capacitive characteristics of said probe.

26. The oscillator of claim 18 further comprising means for generating a digital output signal from said plurality of transient signals to indicate said position of said element.

27. An oscillator for sensing changes in inductance due to the influence of a magnetic or an electrically conductive element comprising, in combination:
   a voltage comparator having an inverting input, a non-inverting input and an output;
   digital control circuit means for distinguishing between transitions of said voltage comparator associated with transient voltage excitation and transitions of said voltage comparator associated with transient voltage decay and having an input coupled to said voltage comparator output and having an output;
   step function generator means for generating a pulsed electrical waveform having an input coupled to said digital control circuit means output and having an output;
   a voltage divider having an input coupled to said step function generator means output and having an output coupled to said non-inverting input of said voltage comparator;
   a resistor having a first terminal coupled to said output of said step function generator means and having a second terminal coupled to said inverting input of said voltage comparator; and
   an electromagnetic probe capable of generating a magnetic field when energized and having a first terminal coupled to said inverting input of said voltage comparator and having a second terminal coupled to circuit ground and located in proximity to said magnetic or electrically conductive element,
   the frequency of said transient voltage excitation indicating the changes in inductance of the probe due to the influence of the magnetic or electrically conductive element.

28. The oscillator of claim 27 wherein said electromagnetic probe energized by said pulsed electrical waveform produces an eddy current response having a particular magnitude in said magnetic or electrically conductive element corresponding to the position of said element, said pulsed electrical waveform induces a transient voltage in said electromagnetic probe.

29. The oscillator of claim 28 wherein said magnitude of said eddy current response is increased when said magnetic or said electrically conductive element is disposed closer to said electromagnetic probe and wherein said magnitude of said eddy current response is reduced when said magnetic or said electrically conductive element is disposed farther from said electromagnetic probe.

30. The oscillator of claim 29 wherein the transient decay time of said transient voltage induced in said probe is reduced when said magnitude of said eddy current response is increased and wherein the transient decay time of said transient voltage induced in said probe is increased when said magnitude of said eddy current response is decreased.

31. The oscillator of claim 30 wherein the frequency of said pulsed electrical waveform is increased when said transient decay time is decreased and wherein the frequency of said pulsed electrical waveform is decreased when said transient decay time is increased.

32. The oscillator of claim 31 wherein said step function generator means comprises:
a reference voltage source;
an operational amplifier having an inverting input, a non-inverting input and an output;
a feedback resistor having a first terminal coupled to said inverting input of said operational amplifier and having a second terminal coupled to said output of said operational amplifier; and
a bias resistor having a first terminal coupled to said reference voltage source and having a second terminal coupled to said inverting input of said operational amplifier.

33. The oscillator of claim 31 wherein said digital control circuit means comprises:
a first bistable multivibrator (BMV) having a clock input, a data input, a clear input coupled to an external activation input signal, an inverting output coupled to an external frequency output signal and a non-inverting output coupled to said input of said step function generator means;
a second BMV having a clock input, a data input coupled to said inverting output of said first BMV, a clear input coupled to said activation input and a non-inverting output coupled to said data input of said first BMV;
a first exclusive-OR gate having a first input coupled to said output of said voltage comparator, having a second input coupled to said non-inverting output of said second BMV and having an output coupled to said clock input of said first BMV;
a monostable multivibrator (MMV) having an input coupled to said output of said first exclusive-OR gate, an active low output, a timing resistor and a timing capacitor;
a second exclusive-OR gate having a first input coupled to said activation input, having a second input coupled to the digital supply voltage and having an output; and
a third exclusive-OR gate having a first input coupled to said output of said second exclusive-OR gate, having a second input coupled to said active low output of said MMV and having an output coupled to said clock input of said second BMV.

34. The oscillator of claim 33 wherein said second exclusive-OR gate functions as an inverter having an input coupled to said activation input and having an output coupled to said first input of said third exclusive-OR gate.

35. The oscillator of claim 31 wherein said pulsed electrical waveform changes polarity in response to a change in the logic level of said output of said digital control circuit means.

36. The oscillator of claim 31 wherein said pulsed electrical waveform proves both an excitation signal for said probe and a reference for said voltage comparator against which said transient voltage is compared.

37. The oscillator of claim 36 wherein the frequency of said pulsed electrical waveform is substantially independent of a magnitude of excitation of said probe.

38. The oscillator of claim 31 wherein an increase in the frequency of said pulsed electrical waveform indicates that said element is disposed closer to said probe and wherein a decrease in the frequency of said pulsed electrical waveform indicates that said element is disposed farther from said probe.

39. The oscillator of claim 31 wherein said resistor is adjusted so that said transient voltage response of said probe is overdamped and has both an exponential excitation response and an exponential decay response.

40. The oscillator of claim 39 wherein the frequency of said pulsed electrical waveform is substantially independent of changes in ambient temperature.

41. The oscillator of claim 39 wherein the frequency of said pulsed electrical waveform is substantially independent of changes in the resistive and capacitive characteristics of said probe.

42. The oscillator of claim 31 further comprising means for generating a digital output signal from a plurality of said transient signals to indicate said position of said element.

43. The oscillator of claim 31 further comprising:
analog switch means for switching between a normal operating mode and a calibration mode having a first analog input coupled to said probe, having a second analog input coupled to circuit ground, having a digital control input and having an analog output coupled to said voltage comparator;
said normal operating mode having a frequency of operation that is determined by both said decay time of said transient voltage and by circuit propagation delays;
said calibration mode having a frequency of operation that is determined solely by circuit propagation delays.
* * * * *